(12) United States Patent
Noble et al.

(10) Patent No.: US 9,249,667 B2
(45) Date of Patent: Feb. 2, 2016

(54) TURBOMACHINE BLADE WITH IMPROVED STIFFNESS TO WEIGHT RATIO

(75) Inventors: Patrick Daniel Noble, Greenville, SC (US); Joseph Anthony Weber, Simpsonville, SC (US); Donald Earl Floyd, II, Greenville, SC (US)

(73) Assignee: General Electric Company, Schenectady, NY (US)

( * ) Notice: Subject to any disclaimer, the term of this patent is extended or adjusted under 35 U.S.C. 154(b) by 790 days.

(21) Appl. No.: 13/421,743

(22) Filed: Mar. 15, 2012

(65) Prior Publication Data

US 2013/0243600 A1   Sep. 19, 2013

(51) Int. Cl.
*F01D 5/14* (2006.01)
*F01D 11/08* (2006.01)

(52) U.S. Cl.
CPC ............. *F01D 5/147* (2013.01); *F01D 11/08* (2013.01); *F05D 2240/307* (2013.01); *Y02T 50/671* (2013.01)

(58) Field of Classification Search
CPC ............ F01D 5/14; F01D 5/147; F01D 5/18; F01D 5/181; F01D 11/08; F05D 2240/307; Y02T 50/671
USPC .................. 416/189, 190, 191, 192
See application file for complete search history.

(56) References Cited

U.S. PATENT DOCUMENTS

| | | | |
|---|---|---|---|
| 3,825,364 A | 7/1974 | Halila et al. | |
| 4,390,320 A | 6/1983 | Eiswerth | |
| 4,682,933 A * | 7/1987 | Wagner | 415/173.5 |
| 5,350,277 A * | 9/1994 | Jacala et al. | 416/90 R |
| 5,496,046 A | 3/1996 | Brandon | |
| 5,509,784 A * | 4/1996 | Caruso et al. | 416/222 |
| 5,531,568 A * | 7/1996 | Broadhead | 416/97 R |
| 5,890,873 A | 4/1999 | Willey | |
| 6,027,306 A * | 2/2000 | Bunker | 415/173.5 |
| 6,135,715 A * | 10/2000 | Correia | 416/97 R |
| 6,152,695 A * | 11/2000 | Fukue et al. | 416/97 R |
| 6,241,471 B1 | 6/2001 | Herron | |
| 6,254,345 B1 | 7/2001 | Harris et al. | |
| 6,471,480 B1 | 10/2002 | Balkcum, III et al. | |
| 6,491,498 B1 | 12/2002 | Seleski | |
| 8,317,476 B1 * | 11/2012 | Liang | 416/97 R |
| 2009/0180893 A1 * | 7/2009 | Brittingham | 416/97 R |
| 2009/0180894 A1 | 7/2009 | Brittingham et al. | |

FOREIGN PATENT DOCUMENTS

| | | |
|---|---|---|
| CN | 101482032 A | 7/2009 |
| EP | 2402559 A1 | 1/2012 |

(Continued)

OTHER PUBLICATIONS

Search Report and Written Opinion from corresponding EP Application No. 13159074.7, dated Jun. 12, 2013.

(Continued)

*Primary Examiner* — Edward Look
*Assistant Examiner* — Danielle M Christensen
(74) *Attorney, Agent, or Firm* — Fletcher Yoder, P.C.

(57) ABSTRACT

A system includes a turbomachine that includes a stator and a rotor. The rotor is configured to rotate about a rotational axis relative to the stator. In addition, the rotor includes a least one rotary blade, and the at least one rotary blade has a patterned structure of beams and cavities.

22 Claims, 4 Drawing Sheets

(56) References Cited

FOREIGN PATENT DOCUMENTS

| | | |
|---|---|---|
| EP | 2599958 A2 | 6/2013 |
| JP | 09264101 A | 10/1997 |

OTHER PUBLICATIONS

Unofficial English translation of Office Action issued in connection with corresponding CN Application No. 201310084267.9 on May 21, 2015.

* cited by examiner

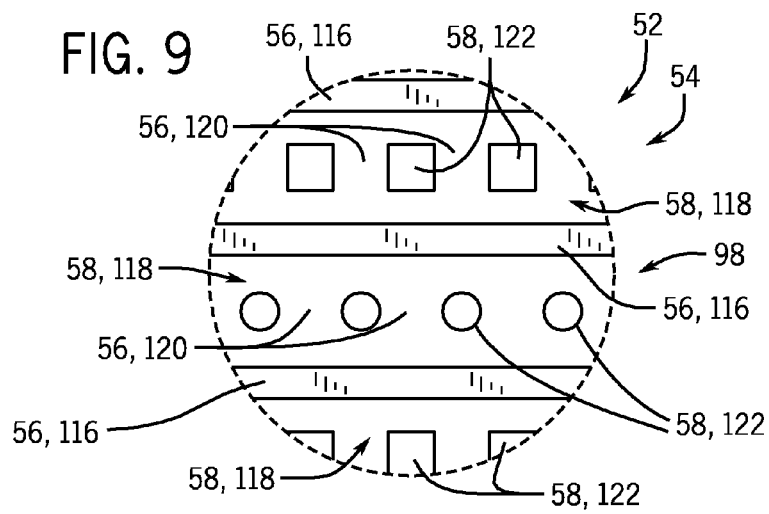
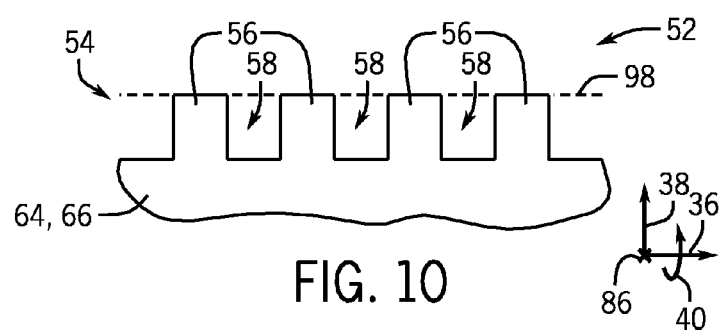
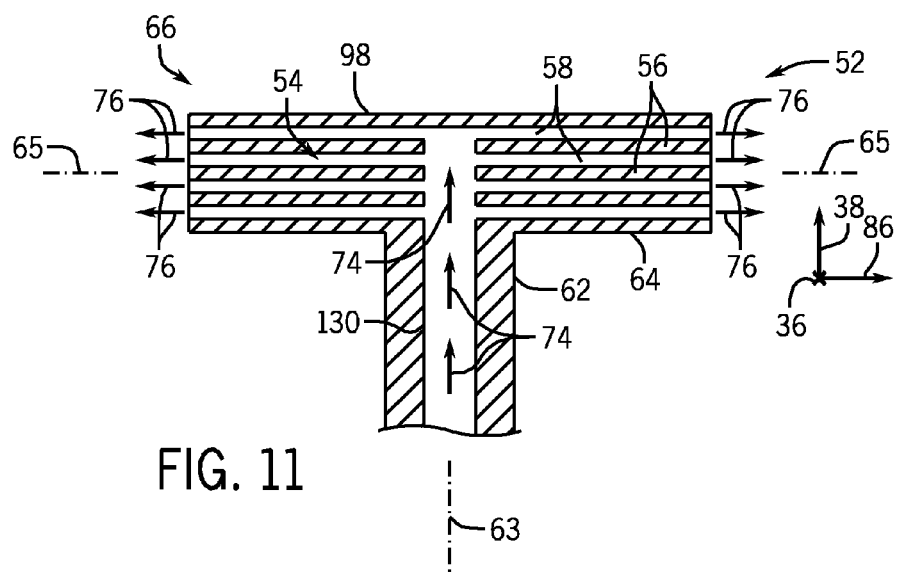

TURBOMACHINE BLADE WITH IMPROVED STIFFNESS TO WEIGHT RATIO

BACKGROUND OF THE INVENTION

The subject matter disclosed herein relates to turbomachines and, more particularly, to a turbomachine blade with an improved stiffness to weight ratio.

Turbomachine systems include gas turbines, steam turbines, hydro turbines, compressors, and other rotating machinery. In general, such turbomachines are configured to use rotary blades to extract energy from a fluid flow, such as gas, steam, or water. For instance, the rotary blades may extend radially outwards from a supporting rotor, and the rotary blades may force rotation of the rotor as the fluid flow passes across the rotary blades. Certain turbomachines include rotary blades having a tip shroud located at a tip portion of each rotary blade extending from the rotor for added stiffness and stability. Unfortunately, existing designs of tip shrouds on such rotary blades may limit performance of the turbomachine system. For example, the size of the tip shroud (i.e., rotary blade tip coverage) may be restricted for tip shrouds based on tip shroud weight. Consequently, a stiffness to weight ratio of a tip shroud designed to provide a desired stiffness may limit the available rotary blade tip coverage, thereby limiting the efficiency of the turbomachine.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbomachine including a stator and a rotor configured to rotate about a rotational axis relative to the stator. The rotor includes at least one rotary blade having a patterned structure of beams and cavities.

In a second embodiment, a system includes at least one rotary blade having a blade portion and a tip portion. The tip portion includes a patterned structure of beams and cavities.

In a third embodiment, a system includes a tip portion of a rotary blade including a tip shroud having a patterned structure of beams and cavities. The tip shroud is configured to protrude away from a blade portion of the rotary blade in a crosswise direction relative to a longitudinal axis of the blade portion. The patterned structure has the beams oriented in the crosswise direction to reduce stress and/or deflection. The patterned structure has the cavities to reduce weight of the tip portion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 9 is a top view of an embodiment of the rotary blade of FIG. 4, taken within line 8-8, illustrating a patterned structure having alternating sets of beams and cavities;

FIG. 10 is a side view of an embodiment of the rotary blade of FIG. 4, taken within line 10-10, illustrating a patterned structure of beams and cavities disposed in a laterally protruding exterior portion of the blade; and FIG. 11 is a front cross-sectional view of an embodiment of the rotary blade of FIG. 3, taken within line 11-11, illustrating airflow through a patterned structure of beams and cavities in the rotary blade.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to systems for improving a stiffness to weight ratio of rotating turbomachinery components (e.g., a rotary blade of a turbomachine system). The rotary blade (e.g., turbine blade or compressor blade) includes a patterned structure of beams and cavities for increasing the stiffness to weight ratio of a tip shroud of the rotary blade. The patterned structure may be formed through the tip shroud, extended along an exterior portion of the tip shroud, or a combination thereof. The beams and cavities of the patterned structure may be aligned in a crosswise direction relative to a longitudinal axis of the rotary blade. In some embodiments, the beams and cavities may be oriented such that they align with a direction of stress and/or deflection of the rotary blade. Indeed, the beams may increase a stiffness of the rotary blade in the direction of orientation of the patterned structure, while the cavities reduce the overall weight of the patterned structure. By increasing the stiffness to weight ratio of the rotary blade, the patterned structure of beams and cavities may be applied to a relatively larger tip shroud than would be possible on a rotary blade without the patterned structure.

Figure 1:
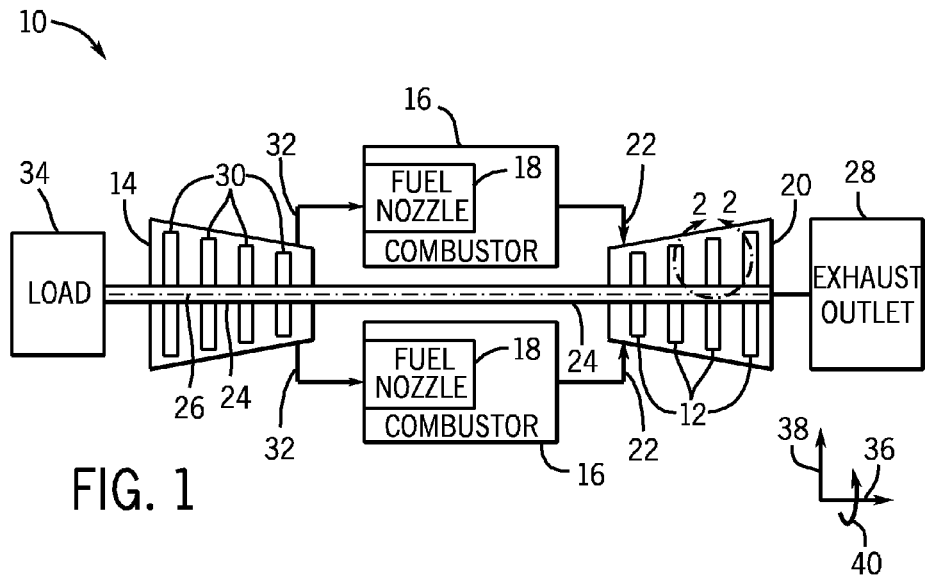
FIG. 1 is a schematic of an embodiment of a turbomachine system including a turbine having a turbine blade with a patterned structure of beams and cavities.

Turning now to the drawings, FIG. 1 illustrates a block diagram of an embodiment of a turbomachine system 10 (e.g., gas turbine system) having turbine blades 12 and/or compressor blades 30 that include patterned structures of beams and cavities. The patterned structure of beams and cavities, described in detail below, may be a honeycomb pattern, grid of crosswise beams, grill of parallel beams, or a combination thereof. The system 10 includes a compressor 14, combustors 16 having fuel nozzles 18, and a turbine 20. The fuel nozzles 18 route a liquid fuel and/or gas fuel, such as natural gas or syngas, into the combustors 16. The combustors 16 ignite and combust a fuel-air mixture, and then pass hot pressurized combustion gases 22 (e.g., exhaust) into the turbine 20. Turbine blades 12 are coupled to a rotor 24, which is also coupled to several other components throughout the turbomachine system 10, as illustrated. As the combustion gases 22 pass through the turbine blades 12 in the turbine 20, the turbine 20 is driven into rotation, which causes the rotor 24 to rotate about a rotational axis 26. Eventually, the combustion gases 22 exit the turbine 20 via an exhaust outlet 28.

In the illustrated embodiment, the compressor 14 includes compressor blades 30. The compressor blades 30 within the compressor 14 are coupled to the rotor 24, and rotate as the rotor 24 is driven into rotation by the turbine 20, as discussed above. As the compressor blades 30 rotate within the compressor 14, the blades 30 compress air from an air intake into pressurized air 32, which may be routed to the combustors 16, the fuel nozzles 18, and other portions of the gas turbomachine system 10. The fuel nozzles 18 may then mix the pressurized air and fuel to produce a suitable fuel-air mixture, which combusts in the combustors 16 to generate the combustion gases 22 to drive the turbine 20. Further, the rotor 24 may be coupled to a load 34, which may be powered via rotation of the rotor 24. By way of example, the load 34 may be any suitable device that may generate power via the rotational output of the turbomachine system 10, such as a power generation plant or an external mechanical load. For instance, the load 34 may include an electrical generator, a propeller of an airplane, and so forth. In the following discussion, reference may be made to various directions, such as an axial direction or axis 36, a radial direction or axis 38, and a circumferential direction or axis 40 of the turbomachine system 10.

Figure 2:
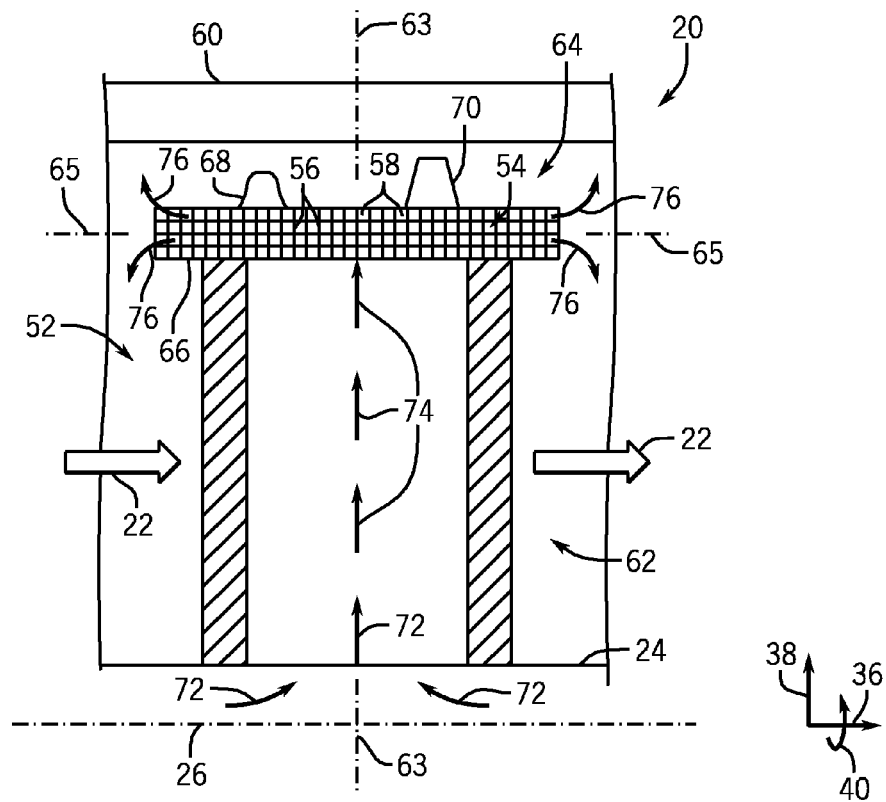
FIG. 2 is a side cross-sectional view of an embodiment of the turbomachine system of FIG. 1, taken within line 2-2, illustrating a rotary blade having a patterned structure of beams and cavities.

FIG. 2 is a partial side cross-sectional view of an embodiment of the turbomachine system 10 of FIG. 1, taken within line 2-2, illustrating a rotary blade 52 (e.g., turbine blade 12 or compressor blade 30) having a patterned structure 54 of beams 56 and cavities 58. Although the illustrated embodiment shows the rotary blade 52 in the context of the turbine 20, the patterned structure 54 may be applied to a rotating component of any turbomachine (e.g., compressor 14, turbine 20, or a combination thereof). The turbine 20 of FIG. 2 includes the rotor 24 and a stator 60 (i.e., stationary component of the turbine 20), and the rotor 24 is configured to rotate in the circumferential direction 40 about the rotational axis 26, 36 relative to the stator 60. The rotor 24 may include one or more of the rotary blades 52 (e.g., turbine blades 12, compressor blades 30, or rotating buckets), since these rotary blades 52 extend radially 38 outward from the rotor 24. For example, the rotor 24 may include 10 to 1000 blades 52 circumferentially 40 spaced about the axis 26, 36 of the rotor 24 in one or more stages of the compressor 14 and/or the turbine 20. As previously mentioned, combustion of a fuel-air mixture in the combustors 16 releases pressurized combustion gases 22 to the turbine 20, and these gases 22 travel through the turbine 20 in the axial direction 36, passing against and around the rotary blade 52 to drive the rotation of the rotor 24.

The rotary blade 52 includes a blade portion 62 and a tip portion 64, the blade portion 62 extending radially outward (as defined by the radial axis 38) and the tip portion 64 being located at a distal end of the blade portion 62 relative to the rotor 24. The blade portion 62 (e.g., airfoil) may be the portion of the rotary blade 52 that is forced by the combustion gases 22 to rotate about the rotational axis 26, driving the rotation of the rotor 24 relative to the stator 60. The blade portion 62 may be specifically contoured or shaped to maximize the rotation of the rotor 24 caused by these combustion gases 22. The tip portion 64 of the rotary blade 52 may include a tip shroud 66 that protrudes laterally away from the rotary blade 52 in order to inhibit escape of the combustion gases 22 radially beyond the tip portion 64, thereby maintaining a flow of the combustion gases 22 in the axial direction 36. For example, the tip shroud 66 may extend in a crosswise direction (e.g., perpendicular) relative to a longitudinal axis 63 of the rotary blade 52. By further example, the tip shroud 66 may extend along a plane 65 that is substantially perpendicular to the axis 63. Furthermore, the tip shroud 66 may protrude laterally (e.g., in plane 65) away from the blade portion 62 in opposite axial direction 36 and opposite circumferential direction 40. By reducing the escape of combustion gases 22 away from the blade portion 62 of the rotary blade 52, the tip shroud 66 may increase an efficiency of the turbine 20. The illustrated tip shroud 66 includes a stiffener rail 68 and a seal tooth 70 extending radially 38 from the tip shroud 66 toward the stator 60 of the turbine 20. The stiffener rail 68 may increase the stiffness of the tip shroud 60 in a desired direction, reducing the effect of certain stresses and/or deflections on the tip portion 64 as the rotary blade 52 rotates. The seal tooth 70 of the tip shroud 66 extends relatively closer to the stator 60, creating a seal between the rotating rotor 24, which includes the rotary blade 52, and the non-rotating stator 60 of the turbomachine system 10. This may further direct the combustion gases 22 to travel axially (e.g., in the axial direction 36) through the turbine 20, instead of between the rotary blades 52 and the stator 60.

In the illustrated embodiment, the tip shroud 66 includes the patterned structure 54 of beams 56 and cavities 58, which is discussed in detail below. As mentioned above, the patterned structure 54 may be a honeycomb structure, a grid of crosswise cavities 58, a grill of parallel beams 56, or other similarly repeating patterns. The patterned structure 54 (e.g., honeycomb, grid of cavities, grill of beams, etc.) may be applied in a variety of arrangements, patterns, orientations, and locations of the rotary blade 52. For example, the patterned structure 54 may be applied to the tip portion 64 (e.g., outermost 1 to 50% of the radial length) of a rotary blade 52 that does not include a tip shroud 66. In addition, the patterned structure 54 may include any number of layers of beams 56 and cavities 58 (e.g., 1 to 100 layers) stacked one over another in the radial direction 38. The beams 56 of the patterned structure 54 may be oriented to increase stiffness of the tip portion 64 of the rotary blade 52 in a desired direction, thereby improving a resistance of the rotary blade 52 to stresses and/or deflections, which may be caused by the force of the pressurized combustion gas 22, centrifugal force of the rotating machinery, etc. The patterned structure 54 features the cavities 58 to reduce the weight of the tip shroud 66 or tip portion 64 of the rotary blade 52. Thus, the patterned structures 54 may increase a stiffness to weight ratio of the tip shroud 66 or tip portion 64 of the rotary blade 52 in a desired direction. Increasing this ratio may allow a relatively larger tip shroud 66 to be used because of the reduction in weight of the tip shroud 66 for achieving a desired stiffness. Furthermore, the larger tip shroud 66 may provide better coverage of the tip portion 64 of the rotary blade 52, further reducing the amount of the combustion gas 22 that escapes the rotary blades 52. In this way, the turbine stage efficiency of the turbomachine system 10 may be improved. In addition, increasing the ratio of stiffness to weight within the tip shroud 66 may allow a lighter tip portion 64 to be used for the rotary blade 52. Such a lighter rotary blade 52 may be easier to accelerate and helpful for balancing the rotary blade 52. A relatively larger amount of weight of the rotary blade 52 may be concentrated toward the rotor 24 and less weight may be concentrated at the tip portion 64. As a result, the centrifugal force due to rotation of the rotary blade 52 may be lessened, and this may decrease the amount of deflection of the rotary blade 52.

In certain embodiments, the patterned structure 54 may be completely independent from or unrelated to any coolant flows (e.g., airflow through the rotary blade 52). In other embodiments, the patterned structure 54 may be used in conjunction with coolant flows. For example, the cavities 58 of the patterned structure 54 formed in the tip shroud 66 also may provide additional channels for cooling the rotary blade 52. Heat from the pressurized combustion gas 22 combined with the rotational motion of the rotor 24 may increase the temperature of the rotary blade 52 significantly, and additional cooling of the blade 52 may be desired. Indeed, the blade portion 62 of the rotary blade 52 may be hollow, as illustrated in FIG. 2, allowing coolant (e.g., air) to flow into the rotary blade 52 from the rotor 24, as shown by arrows 72. The air may travel through the rotary blade 52, as shown by arrows 74, to cool the blade from the blade portion 62 to the tip portion 64 through forced air convection. The cooling air may then exit the rotary blade 52 through the cavities 58 of the patterned structure 54 in the tip shroud 66, as shown by arrows 76. Thus, optional cooling may be provided to the tip shroud 66 as well as to the blade portion 62 of the rotary blade 52.

Figure 3:
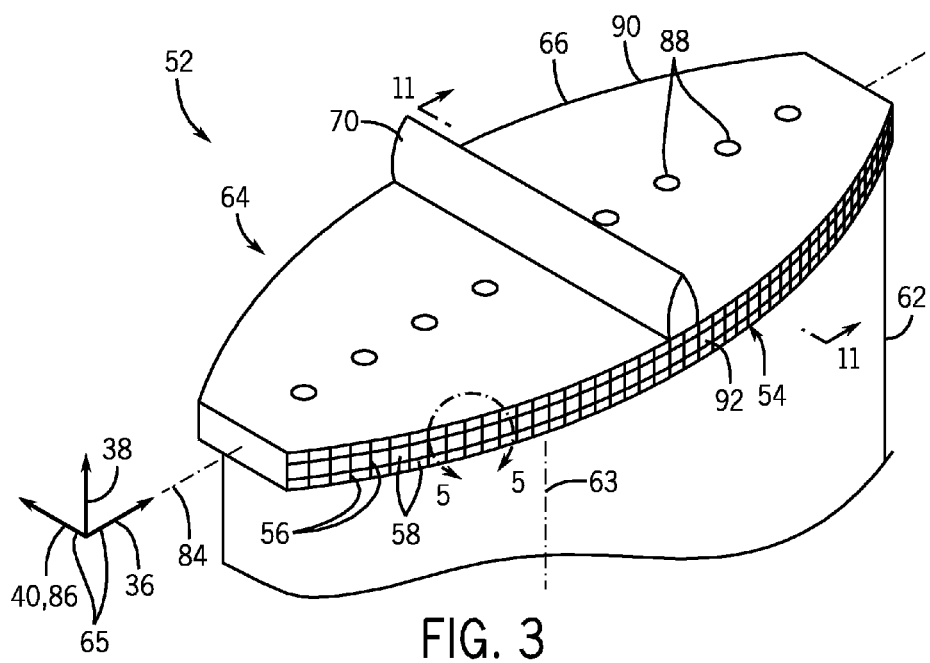
FIG. 3 is a partial perspective view of an embodiment of a rotary blade with a patterned structure of beams and cavities oriented in a crosswise direction.

FIG. 3 is a partial perspective view of another embodiment of the rotary blade 52 that forms part of the rotor 24 of a turbomachine. The rotary blade 52 includes the blade portion 62 and the tip portion 64 having the tip shroud 66. Further, the tip shroud 66 includes the seal tooth 70 for establishing a seal between the rotating rotary blade 52 and the non-rotating stator 60 of the turbomachine. The tip portion 64 includes an elongated shape along a longitudinal axis 84 of the tip portion 64, and this longitudinal axis 84 may be aligned with the axial direction 36. Also, the blade portion 62 includes an elongated shape along the longitudinal axis 63 of the blade portion 62, and this longitudinal axis 63 may be aligned with the radial direction 38. The tip shroud 66 protrudes away from the blade portion 62 in a crosswise direction 86 (e.g., circumferential direction 40) relative to the longitudinal axes 63 and 84. Indeed, the tip shroud 66 protrudes from the blade portion 62 in opposite axial directions 36 and opposite crosswise directions 86 (e.g., opposite circumferential directions 40) relative to the longitudinal axis 63 of the rotary blade 52. Although illustrated as being perpendicular to both the axial direction 36 and radial direction 38, this crosswise direction 86 may correspond to any direction that intersects the axial direction 36 and is generally angled (e.g., perpendicular) to the radial direction 38 (e.g., any direction in the plane 65 of the illustrated directions 36 and 86).

The illustrated patterned structure 54 of the tip shroud 66 has the beams 56 (and cavities 58) oriented (e.g., elongated) in the crosswise direction 86. Since the beams 56 are configured to provide stiffness to the rotary blade 52, it may be desirable for the beams 56 to be oriented in a direction of stress and/or deflection of the rotary blade 52. This stress and/or deflection may be caused by the impact of combustion gases 22 on the blade portion 62, centrifugal force of the rotating rotary blade 52, and the like. A direction of maximum stress and/or deflection may be determined through empirical testing and/or simulations of the rotary blade 52 under expected loading conditions. Indeed, the direction of stress and/or deflection may correspond to the crosswise direction 86 of the tip shroud 66. Therefore, the tip shroud 66 may protrude away from the blade portion 62 of the rotary blade 52 in opposite crosswise directions 86 relative to the longitudinal axis 84 of the blade portion 62, and the patterned structure 54 of beams 56 and cavities 58 may be oriented in the crosswise direction 86 to reduce the stress and/or deflection of the rotary blade 52 throughout operation. In other embodiments, the direction of stress and/or deflection may not correspond to the crosswise direction 86 in which the tip shroud 66 protrudes away from the longitudinal axes 63 and 84. Indeed, the patterned structure 54 may be aligned with a direction of stress and/or deflection that is oriented approximately 0-90° from the crosswise direction 86 (e.g., 45 from both the longitudinal axis 84 and the crosswise direction 86). By orienting the patterned structure 54 in the direction of highest expected stress and/or deflection, a higher stiffness to weight ratio of the rotary blade 52 may be achieved, as the beams 56 provide stiffness in the desired direction and the cavities 58 reduce the weight.

The patterned structure 54 of beams 56 and cavities 58 may be introduced to the rotary blade 52 of the turbomachine system 10 using one or more of several different manufacturing techniques. Moreover, the desired technique for manufacturing the patterned structure 54 may be determined based on the desired structure of the tip shroud 66 of the rotary blade 52. For example, constructing the rotary blade 52 from multiple components that are secured together may allow a certain ease of manufacturing. However, any locations of bracing or connecting (e.g., welding) the different components of the rotary blade 52 may provide a location of internal stress concentration, where additional stiffness may be desired. Therefore, it may be desirable for the rotary blade 52 to include a one-piece structure having both the blade portion 62 and the tip portion 64, including the patterned structure 54, in order to reduce stress concentrations throughout the rotary blade 52. Such a one-piece structure may be constructed by casting the structure using a mold, coring the patterned structure 54 into the rotary blade 52, and/or machining the patterned structure 54 into the rotary blade 52 using plunge electrical discharge machining (EDM) techniques. Plunge EDM utilizes repetitive electrical discharges to remove small pieces of metal from a structure, and this technique may be applied to the rotary blade 52 to form the cavities 58 of the desired patterned structure 54. Indeed, plunge EDM may allow a relatively small and precise pattern of beams 56 and cavities 58 to be formed in the rotary blade 52. The plunge EDM method may be limited, however, with regard to the depth to which the patterned structure 54 may be formed in the tip shroud 66 of the rotary blade 52. For example, some plunge EDM machines may only be capable of penetrating a certain depth (e.g., approximately 2.5 cm) into a given material. The technique may still be used to increase a stiffness to weight ratio in the tip shroud 66, however, as plunge EDM may be used to form the patterned structure 54 in the crosswise direction 86 from circumferentially opposite edges 90 and 92 of the tip shroud 66 extending away from the longitudinal axis 84. The patterned structure 54 may reach from both edges 90 and 92 and connect in the middle, or there may be a solid layer of material remaining toward the center (e.g., along axis 84) of the tip shroud 66, between the two patterned structures 54. It may be possible to construct the patterned structure 54 such that certain of the cavities 58 are formed through the tip shroud 66 to different depths to achieve a desired distribution of stiffness throughout the tip shroud 66 based on the expected levels of stress concentration therein. Regardless of the manufacturing technique or the depth of the patterned structure 54, the increased stiffness to weight ratio provided by the beams 56 and cavities 58 may allow the use of a relatively larger tip shroud 66 to provide greater coverage to the tip portion 64 of the rotary blade 52.

The tip shroud 66 also may include a number of cooling holes 88 formed therein for cooling the rotary blade 52. As illustrated in FIG. 1, air may be permitted to flow into the hollow blade portion 62 of the rotary blade 52, thereby reducing a temperature of the rotary blade 52. In certain rotary blade arrangements, this air may exit the rotary blade 52 through the cooling holes 88 that are oriented in the radial direction 38. As illustrated, the cooling holes 88 are spaced apart in alignment with axis 84, but the cooling holes 88 could be in any other arrangement. Since the patterned structure 54 includes cavities 58 that are oriented in the crosswise direction 86, which may be perpendicular to the radial direction 38, the cavities 58 may intersect internal passages that direct air to the cooling holes 88. This may allow air to flow through the tip shroud 66 in the crosswise direction 86 as well, cooling a greater portion of the rotary blade 52. However, in some embodiments, the cooling holes 88 do not intersect the patterned structure 54, and thus no coolant (e.g., cooling air) can flow through the cavities 58 in the patterned structure 54.

Figure 4:
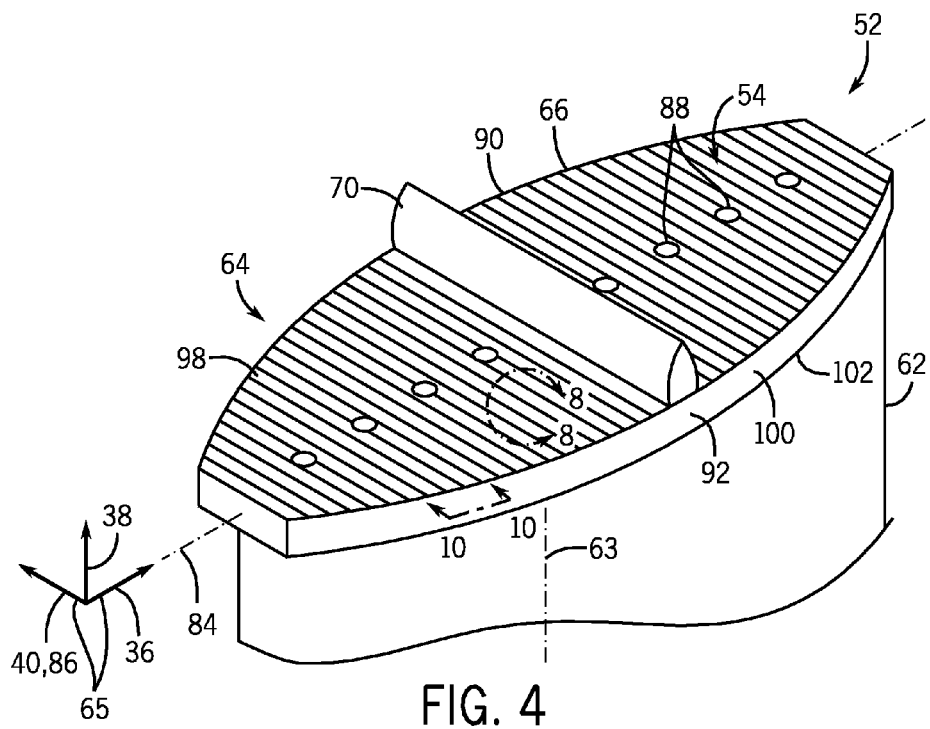
FIG. 4 is a partial perspective view of an embodiment of a rotary blade with a patterned structure of beams and cavities extending along an exterior portion of a tip shroud.

FIG. 4 is a partial perspective view of an embodiment of the rotary blade 52 with the patterned structure 54 of beams 56 and cavities 58 extending along an exterior portion 98 (e.g., radially outward face) of the tip shroud 66. The rotary blade 52 has a similar shape and arrangement of certain components of the rotary blade 52 of FIG. 3, but the patterned structure 54 has at least a portion of the beams 56 and cavities 58 extending along the upper exterior portion 98 of the tip shroud 66. The beams 56 and cavities 58 may be parallel protrusions and slots, respectively, which extend the full distance or less than the full distance between the opposite edges 90 and 92. This arrangement of the patterned structure 54 may be easier to manufacture than a more internal arrangement of the patterned structure 54 (e.g., FIG. 3), while providing a desired increase in the stiffness to weight ratio of the tip shroud 66. Indeed, the beams 56 and cavities 58 may be oriented (e.g., elongated) in the crosswise direction 86 (e.g., circumferential direction 40) to increase stiffness of the tip shroud 66 in a direction of stress and/or deflection, as previously mentioned. The patterned structure 54 also may include multiple layers of the beams 56 and cavities 58 extending through the tip shroud 66 at positions away from (e.g., radially recessed into) the exterior portion 98, in addition to extending along the exterior portion 98. In other embodiments, the patterned structure 54 may extend along other exterior portions (e.g., a lateral perimeter portion 100 and/or underside portion 102) of the tip shroud 66 instead of or in addition to the upper exterior portion 98 of the tip shroud 66. The lateral perimeter portion 100 may include the opposite edges 90 and 92. As before, the beams 56 and cavities 58 extending along the exterior portion 98 may or may not intersect the cooling holes 88 of the rotary blade 52.

Figure 5:
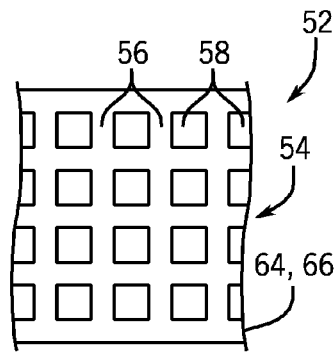
FIG. 5 is a side view of an embodiment of the rotary blade of FIG. 3, taken within line 5-5, illustrating a patterned structure of substantially rectangular beams and cavities.
Figure 6:
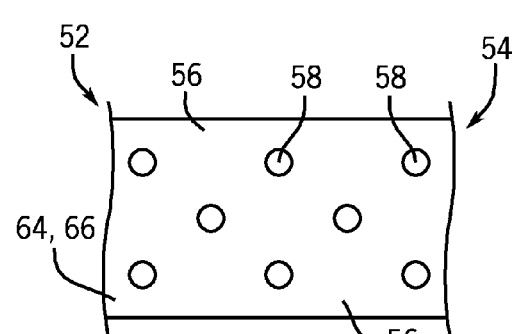
FIG. 6 is a side view of an embodiment of the rotary blade of FIG. 3, taken within line 5-5, illustrating a patterned structure of beams and substantially circular cavities.
Figure 7:
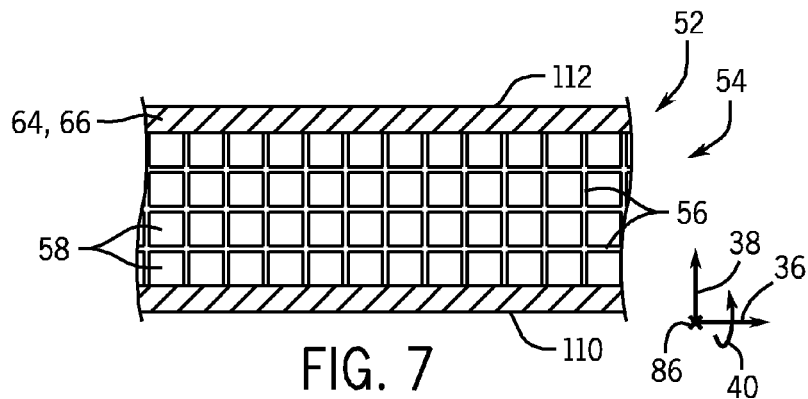
FIG. 7 is a side view of an embodiment of the rotary blade of FIG. 3, taken within line 5-5, illustrating a patterned structure of substantially rectangular beams and circular cavities disposed between a radially inner plate portion and a radially outer plate portion.

FIGS. 5-7 are side views of different embodiments of the rotary blade 52 of FIG. 3, taken within line 5-5, illustrating different patterned structures 54 of beams 56 and cavities 58 that may be utilized to improve the stiffness to weight ratio of the rotary blade 52. As mentioned before, increasing this ratio may allow a rotary blade 52 with a larger tip shroud 66 to be used with the rotor 24, improving performance of the turbomachine system 10 (e.g., increasing turbine or compressor stage efficiency). Furthermore, this increase in the stiffness to weight ratio may be particularly effective when the beams 56 and cavities 58 are aligned in a direction of stress and/or deflection of the rotary blade 52. FIGS. 5-7 illustrate different patterned structures 54 viewed from the crosswise direction 86 in which the beams 56 and cavities 58 are aligned. Thus, these patterned structures 54 are effectively shown from a side view and/or a cross-sectional view. As shown in FIGS. 5-7, the patterned structure 54 of beams 56 and cavities 58 may include multiple layers of beams 56 and cavities 58 within the tip shroud 66. As previously mentioned, the patterned structure 54 of the tip shroud 66 may include any number of layers of beams 56 and cavities 58 (e.g., 1 to 100 layers) stacked one over another in the radial direction 38, and such layered arrangements of the patterned structure 54 will be apparent in FIGS. 5-7

FIG. 5 illustrates the patterned structure 54 having substantially rectangular beams 56 and cavities 58. The beams 56 may act as I-beams within the patterned structure 54, reducing a deflection of the tip shroud 66 in response to external and/or internal forces on the tip shroud 66 in the crosswise direction 86. The beams 56 and cavities 58 may be aligned with a direction of relatively high stress and/or deflection in order to offer greater stiffness where desired, while using less material. In the illustrated embodiment, the patterned structure 54 includes multiple layers (e.g., stacked one over another) of beams 56 and cavities 58 arranged within the tip shroud 66. This patterned structure 54 includes beams 56 and cavities 58 that are approximately equal in size and equally spaced, arranged in multiple layers that are both vertically and horizontally aligned. However, other arrangements of the patterned structure 54 of beams 56 and cavities 58 may be employed, as described in detail below. As previously described, the patterned structure 54 may be formed into the rotary blade 52 using plunge EDM. This technique may allow the patterned structure 54 to be precisely constructed to a desired size of beams 56 and cavities 58. For example, a desired width of the beams 56 may fall within a range of about 0.010-0.040, 0.016-0.034, 0.020-0.028, or approximately 0.025 cm. In addition, a desired width of the cavities may fall within a range of about 0.010-0.040, 0.012-0.030, 0.014-0.020, or approximately 0.018 cm.

FIG. 6 illustrates the patterned structure 54 having substantially circular cavities 58. This arrangement allows the cavities 58 to roughly define the beams 56 as the portions of the tip shroud 66 located between the cavities 58. The cavities 58 and the beams 56 are approximately equally spaced from one another but staggered vertically and horizontally. The illustrated embodiment shows the cavities 58 arranged diagonally within the plane. However, the beams 56 and cavities 58 extend into the tip shroud 66 in the same direction, maintaining a parallel alignment with one another no matter what repeated pattern is used. As previously mentioned, the patterned structure 54 may include any number of layers of the beams 56 and cavities 58.

FIG. 7 illustrates the tip shroud 66 having the patterned structure 54 of beams 56 and cavities 58 disposed between two plate portions 110 and 112. That is, the tip shroud 66 includes a radially inner plate portion 110 and a radially outer plate portion 112 disposed about the patterned structure 54 (e.g., multiple layers of beams 56 and cavities 58), providing additional stiffness to the tip shroud 66. Although the illustrated patterned structure 54 includes three layers of the beams 56 alternating with four layers of the cavities 58, any numbers of layers of beams 56 and cavities 58 (e.g., 1 to 100 layers) may be possible. The radially inner plate portion 110 may be a plate located relatively toward the rotational axis 26 of the rotor 24, forming a lower surface of the tip shroud 66 in the inward radial direction 38. Likewise, the radially outer plate portion 112 may be a plate located relatively away from the rotational axis 26 of the rotor 24, forming an upper surface of the tip shroud 66 in the outward radial direction 38. The radially inner plate portion 110, patterned structure 54 of beams 56 and cavities 58, and radially outer plate portion 112 may make up a one-piece structure. Likewise, the rotary blade 52 may be an entirely one-piece structure having the tip shroud 66 with the patterned structure 54 disposed between the plate portions 110 and 112. For example, EDM plunging techniques may be used to create the cavities 58 in an otherwise solid piece of the tip shroud 66 or rotary blade 52 in such a way that plate portions 110 and 112 are integral with the patterned structure 54 of beams 56 and cavities 58. In other embodiments, the patterned structure 54 may be separate from, and secured between, the plate portions 110 and 112. This may provide greater ease of manufacturing than constructing the patterned structure 54 and plate portions 110 and 112 from a single piece of material. A one-piece structure, however, may further improve stiffness to resist stresses and/or deflections of the tip shroud 66, since there are no connections between separate components that may contribute additional stress concentrations.

It should be noted that the radially inner plate portion 110 and radially outer plate portion 112 may be thicker or thinner than the beams 56 of the patterned structure 54 between the plate portions 110 and 112. Moreover, the patterned structure 54 between the plate portions 110 and 112 may include any pattern of beams 56 and cavities 58, e.g., the previously described rectangular beams 56 and cavities 58 of FIG. 5, the diagonal arrangement of circular cavities 58 of FIG. 6, and other variations and/or combinations of these patterned structures 54. In embodiments where the patterned structure 54 is separate from and secured between the plate portions 110 and 112, the plate portions 110 and 112 may be constructed from different materials and/or from a different material than the patterned structure 54. Furthermore, the tip shroud 66 may include a greater number (e.g., 3, 4, 5, 6, 7, 8, 9, or 10) of radially arranged plate portions disposed about multiple sections of patterned structures 54 of beams 56 and cavities 58. For example, the tip shroud 66 may include a radially intermediate plate portion located between the radially inner plate portion 110 and radially outer plate portion 112, secured between two layers of the patterned structure 54 or included as one piece with the patterned structure 54. Additional variations and/or combinations of the arrangements of patterned structures 54 shown in FIGS. 5-7 may be possible as well.

Figure 8:
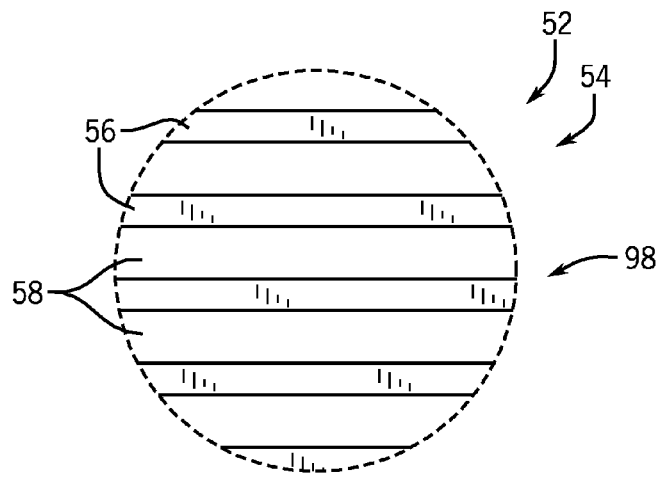
FIG. 8 is a top view of an embodiment of the rotary blade of FIG. 4, taken within line 8-8, illustrating a patterned structure of substantially rectangular beams and cavities.

FIGS. 8 and 9 are top views of embodiments of the rotary blade 52 of FIG. 4, taken within line 8-8, illustrating the patterned structure 54 extending along the exterior portion 98 of the rotary blade 52. By including the patterned structure 54 of beams 56 and cavities 58 along the exterior portion 98 of the rotary blade 52, the stiffness of the rotary blade 52 may be maintained in a desired direction (i.e., the direction along which the beams 56 and cavities 58 are oriented) while the weight of the rotary blade 52 is slightly reduced. FIG. 8 illustrates the beams 56 and cavities 58 arranged in substantially rectangular rows, where the beams 56 extend farther from the exterior portion 98 (in the radial direction 38) than the cavities 58. In the illustrated embodiment, the beams 56 and cavities 58 are approximately the same width, but other variations of beam thickness may be possible.

FIG. 9 illustrates the patterned structure 54 having a plurality of alternating sets of the beams 56 and cavities 58. That is, the patterned structure 54 includes at least a first set of beams 56, 116 and cavities 58, 118, and a second set of beams 56, 120 and cavities 58, 122. In the illustrated embodiment, the first set of beams 56, 116 and cavities 58, 118 extends along the exterior portion 98 of the rotary blade 52, oriented in the crosswise direction 86, and the second set of beams 56, 120 and cavities 58, 122 is oriented in the radial direction 38. Further, some of the cavities 58, 122 are substantially rectangular and some of the cavities 58, 122 are substantially circular. Therefore, multiple sets, which may include different arrangements and/or different orientations of beams 56 and cavities 58, may be combined to achieve a desired stiffness to weight ratio of one or more portions of the rotary blade 52. In addition, the multiple sets, if oriented differently as illustrated, may use the beams 56 to increase stiffness of the rotary blade 52 in more than one direction (e.g., axial 36, radial 38, and/or circumferential 40) that may experience stress and/or deflection throughout operations of the turbomachine system 10.

FIG. 10 is a side view of an embodiment of the rotary blade 52 of FIG. 4, taken within line 10-10, illustrating the patterned structure 54 of beams 56 and cavities 58 extending from the exterior portion 98 of the rotary blade 52. The side view of the illustrated patterned structure 54 is a view in the crosswise direction 86 in which the patterned structure 54 extends. This particular patterned structure 54 may correspond with the patterned structure 54 of FIG. 8, where the beams 56 and the cavities 58 are approximately the same width. The illustrated embodiment shows the beams 56 of the patterned structure 54 extending along the exterior portion 98 of the rotary blade 52 and the cavities 58 formed beneath the exterior portion 98. Therefore, the cavities 58 reduce a weight of the rotary blade 52, while the beams 56 maintain a desired support and stiffness of the rotary blade 52 in the crosswise direction 86 in which the beams 56 extend.

FIG. 11 is a partial front cross-sectional view of an embodiment of the rotary blade 52 of FIG. 3, taken within line 11-11, illustrating airflow through the patterned structure 54 of beams 56 and cavities 58 in the rotary blade 52. Air may enter the hollow blade portion 62 of the rotary blade 52 near the rotational axis 26 and travel outward in the radial direction 38 through the blade portion 62 (arrows 74). This air movement may provide convective cooling to the blade portion 62 of the rotary blade 52, which may be designed to endure relatively high temperatures (e.g., approximately 540° C.). The patterned structure 54 of beams 56 and cavities 58 extends in the crosswise direction 86 entirely through the tip shroud 66, intersecting the hollowed section 130 of the tip portion 64 through which the air flows toward the cooling holes 88. The illustrated cross section does not include cooling holes 88, but other cross sections of the rotary blade 52 may include one or more cooling holes 88 that allow the air to escape through the upper exterior portion 98 of the tip shroud 66. The air also flows through the cavities 58 of the patterned structure 54, providing convective cooling to a greater inner surface area of the tip shroud 66. The air is then expelled from the cavities 58 of the patterned structure 54 in the tip shroud 66, as shown by arrows 76. This arrangement of the patterned structure 54 may provide more cooling than is generally available in tip shrouds 66 having airflow through only the cooling holes 88 in the upper exterior portion 98 of the rotary blade 52. Again, other embodiments of the patterned structure 54 do not intersect the hollowed section 130, and thus do not pass any coolant flow.

Technical effects of the invention include, among other things, increasing a stiffness to weight ratio of a rotary blade in a turbomachine system through a patterned structure of beams and cavities formed in a tip shroud of the rotary blade. The beams of the patterned structure (e.g., honeycomb, grid of cavities, grill of beams, etc.) may be aligned in a direction of stress and/or deflection experienced by the tip shroud, in order to effectively provide the desired stiffness to resist the stress and/or deflection. In addition, the cavities of the patterned structure reduce the weight of the tip shroud, such that a relatively larger tip shroud may be used to provide the same amount of stiffness and rotary blade weight to the turbomachine system. Using a larger tip shroud on the rotary blade may improve the performance of a turbine system in which the rotary blade rotates. That is, the larger tip shroud may provide increased coverage of the rotary blade tip and an improved seal to direct a greater amount of combustion gases through the turbine blades in an axial direction, thereby increasing an efficiency of the turbomachine. In addition to the improved stiffness to weight ratio, the patterned structure of beams and cavities may provide additional cooling passages through the rotary blade. Air may enter the blade portion and exit through the cavities of the patterned structure formed in the tip shroud, providing more extensive cooling to the tip shroud as the rotary blade rotates.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbomachine, comprising:
   a stator; and
   a rotor configured to rotate about a rotational axis relative to the stator, wherein the rotor comprises at least one rotary blade having a grid of beams and cavities extending crosswise to a longitudinal axis of the at least one rotary blade, wherein a width of the cavities, the beams, or both, is between 0.01 and 0.04 centimeters, wherein the grid comprises a plurality of layers of the beams and cavities stacked one over another relative to the longitudinal axis of the at least one rotary blade, wherein the grid extends to an exterior surface along a lateral perimeter portion of the at least one rotary blade.

2. The system of claim 1, wherein the at least one rotary blade comprises a tip portion having the grid.

3. The system of claim 2, wherein the tip portion comprises a tip shroud having the grid, and the tip shroud protrudes away from a blade portion of the at least one rotary blade in a crosswise direction relative to the longitudinal axis of the blade portion.

4. The system of claim 3, wherein the tip shroud comprises a radially inner plate portion and a radially outer plate portion disposed about the grid.

5. The system of claim 4, comprising a one-piece structure having the radially inner plate portion and the radially outer plate portion disposed about the grid.

6. The system of claim 3, wherein the at least one rotary blade comprises a one-piece structure having the tip portion and the blade portion.

7. The system of claim 1, wherein the plurality of layers comprises at least three layers of the beams and cavities stacked one over another relative to the longitudinal axis of the at least one rotary blade.

8. The system of claim 1, wherein the turbomachine comprises a gas turbine engine.

9. The system of claim 1, wherein the grid extends to the exterior surface on opposite sides of the lateral perimeter portion relative to the longitudinal axis.

10. The system of claim 1, wherein the turbomachine comprises a turbine, a compressor, or a combination thereof.

11. The system of claim 1, wherein the grid has the width of the cavities, the beams, or both, between 0.020 and 0.028 centimeters.

12. The system of claim 1, wherein the grid of the beams and cavities is integrally formed as one-piece with the at least one rotary blade.

13. A system, comprising:
    at least one rotary blade having a blade portion and a tip portion, wherein the tip portion comprises a grid of beams and cavities extending crosswise to a longitudinal axis of the blade portion, wherein a width of the cavities, the beams, or both, is between 0.01 and 0.04 centimeters, wherein the grid comprises a plurality of layers of the beams and cavities stacked one over another relative to the longitudinal axis of the blade portion, wherein the grid extends to an exterior surface along a lateral perimeter portion of the tip portion.

14. The system of claim 13, wherein the grid has the width of the cavities, the beams, or both, between 0.016 and 0.034 centimeters.

15. The system of claim 13, wherein the tip portion comprises a tip shroud having the grid, and the tip shroud protrudes away from the blade portion in a crosswise direction relative to the longitudinal axis of the blade portion.

16. The system of claim 13, wherein the plurality of layers comprises at least three layers of the beams and cavities stacked one over another relative to the longitudinal axis of the blade portion.

17. The system of claim 13, wherein the tip shroud comprises a radially inner plate portion and a radially outer plate portion disposed about the grid.

18. The system of claim 13, comprising a turbomachine having the at least one rotary blade.

19. The system of claim 13, wherein the grid has the width of the cavities, the beams, or both, between 0.020 and 0.028 centimeters.

20. The system of claim 13, wherein the the grid of the beams and cavities is integrally formed as one-piece with the tip portion.

21. A system, comprising:
a tip portion of a rotary blade, wherein the tip portion of the rotary blade comprises a tip shroud configured to protrude away from a blade portion of the rotary blade in a crosswise direction relative to a longitudinal axis of the blade portion, wherein the tip shroud comprises a grid of beams and cavities extending in the crosswise direction, wherein a width of the cavities, the beams, or both, is between 0.01 and 0.04 centimeters, wherein the grid comprises a plurality of layers of the beams and cavities stacked one over another relative to the longitudinal axis of the blade portion, wherein the grid extends to an exterior surface along a lateral perimeter portion of the tip shroud.

22. The system of claim 21, comprising a turbomachine having the rotary blade with the tip portion.

* * * * *